United States Patent
Parker

(10) Patent No.: US 6,619,873 B2
(45) Date of Patent: Sep. 16, 2003

(54) DEVICE AND METHOD FOR CLOSING MOVABLE SOCKET ASSEMBLIES BY EXPANDING SOLID COVER PLATES

(75) Inventor: Glen C. Parker, St. Peters, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/948,005

(22) Filed: Sep. 6, 2001

(65) Prior Publication Data
US 2003/0044227 A1 Mar. 6, 2003

(51) Int. Cl.⁷ .............................. F16D 1/12; F16C 11/00
(52) U.S. Cl. ........................................ 403/135; 403/122
(58) Field of Search ........................... 403/27, 39, 122, 403/124, 132, 133, 135, 138, 140–143, 146; 29/283.5, 441.1, 446, 520, 522.1, 701, 808.051

(56) References Cited

U.S. PATENT DOCUMENTS

| | | | |
|---|---|---|---|
| 1,507,840 A | 9/1924 | Landgraf | 29/522.1 |
| 1,730,377 A | * 10/1929 | Northrup | 220/305 |
| 1,801,006 A | * 4/1931 | Jacoby | 220/305 |
| 1,897,253 A | * 2/1933 | Gaubert et al. | 336/65 |
| 1,960,959 A | * 5/1934 | Riedel | 29/898.07 |
| 3,055,086 A | 9/1962 | Hoganson | 29/890.13 |
| 3,062,026 A | * 11/1962 | Pitner | 464/130 |
| 3,269,582 A | * 8/1966 | Knocke | 220/305 |
| 3,318,645 A | 5/1967 | Sutowski | 384/505 |
| 3,367,017 A | * 2/1968 | Evdokimoff | 29/270 |
| 3,602,980 A | 9/1971 | Heffner | 29/509 |
| 3,791,748 A | 2/1974 | Goodrich, Jr. et al. | 403/27 |
| 3,813,178 A | 5/1974 | Herbenar et al. | 403/27 |
| 3,857,149 A | 12/1974 | Hassan | 29/898.043 |
| 3,890,052 A | 6/1975 | Herbenar et al. | 403/27 |
| 3,909,920 A | 10/1975 | Cornish et al. | 29/522.1 |
| 3,958,411 A | 5/1976 | Bernt | 59/86 |
| 4,017,197 A | 4/1977 | Farrant | 403/27 |
| 4,070,121 A | 1/1978 | Graham | 403/27 |
| 4,163,617 A | 8/1979 | Nemoto | 403/132 |
| 4,389,766 A | 6/1983 | Capuano | 29/432.2 |
| 4,477,714 A | 10/1984 | Zorn et al. | 219/149 |
| 4,478,531 A | 10/1984 | Levinson et al. | 403/77 |
| 4,569,126 A | 2/1986 | Weber | 29/707 |
| 4,710,037 A | 12/1987 | Newberg | 384/537 |
| 4,723,350 A | 2/1988 | Kobayashi et al. | 29/417 |
| 4,749,299 A | 6/1988 | Swanson | 403/27 |
| 4,783,985 A | 11/1988 | LaBarge et al. | 72/379.2 |
| 4,823,454 A | 4/1989 | Mills | 29/437 |
| 4,875,794 A | 10/1989 | Kern, Jr. | 403/132 |
| 5,127,156 A | 7/1992 | Yokoyama et al. | 29/890.143 |
| 5,155,897 A | 10/1992 | Schleicher | 29/509 |
| 5,509,749 A | 4/1996 | Eifert et al. | 403/144 |
| 5,517,743 A | 5/1996 | Liebig et al. | 29/521 |
| 5,855,448 A | * 1/1999 | Showalter et al. | 403/134 |
| 5,885,022 A | 3/1999 | Maugham et al. | 403/135 |
| 6,030,141 A | * 2/2000 | Lieber et al. | 403/135 |
| 6,125,541 A | 10/2000 | Parker | 29/898.051 |
| 6,202,280 B1 | 3/2001 | Parker | 29/441.1 |

* cited by examiner

Primary Examiner—Robert J. Sandy
Assistant Examiner—Ruth C. Rodriguez
(74) Attorney, Agent, or Firm—Polster, Lieder, Woodruff & Lucchesi, L.C.

(57) ABSTRACT

An assembly technique is provided for enclosing an open end of a movable socket comprised of fully hardened materials with an expanding solid cover-plate having a circumferential groove on either an upper or lower surface. Internal components of the movable socket are installed within a housing through a posterior opening and a expanding solid cover-plate having a circumferential groove on either an upper surface or a lower surface is positioned over the components within the posterior opening. A ram of the present invention having a configured contact surface is brought into engagement with the solid cover-plate, and pressure is exerted on the solid cover-plate. Pressure exerted by the ram is transferred to the cover-plate through the contact surface, deforming and expanding the cover-plate in a predetermined manner to close the socket housing.

9 Claims, 6 Drawing Sheets

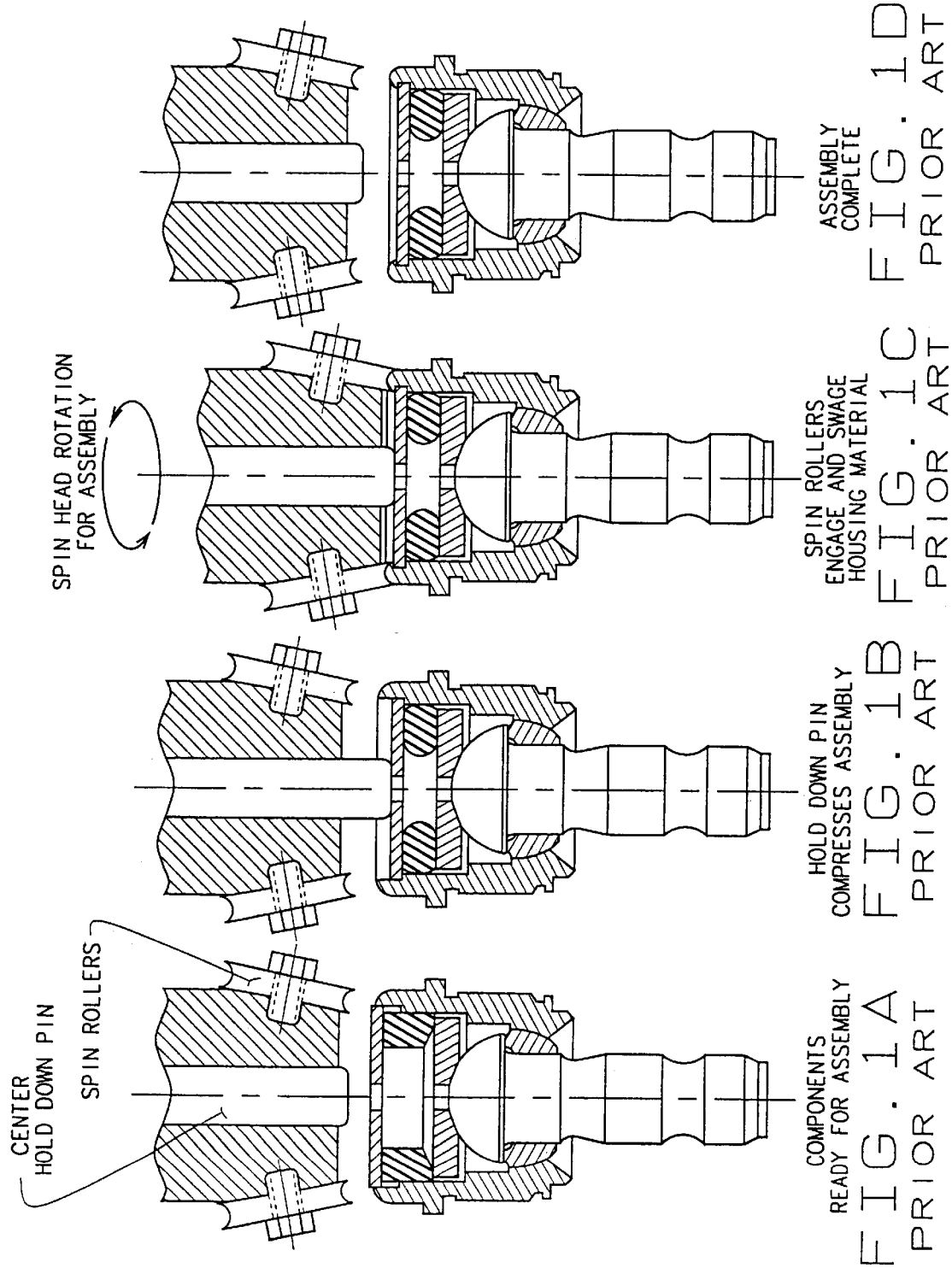

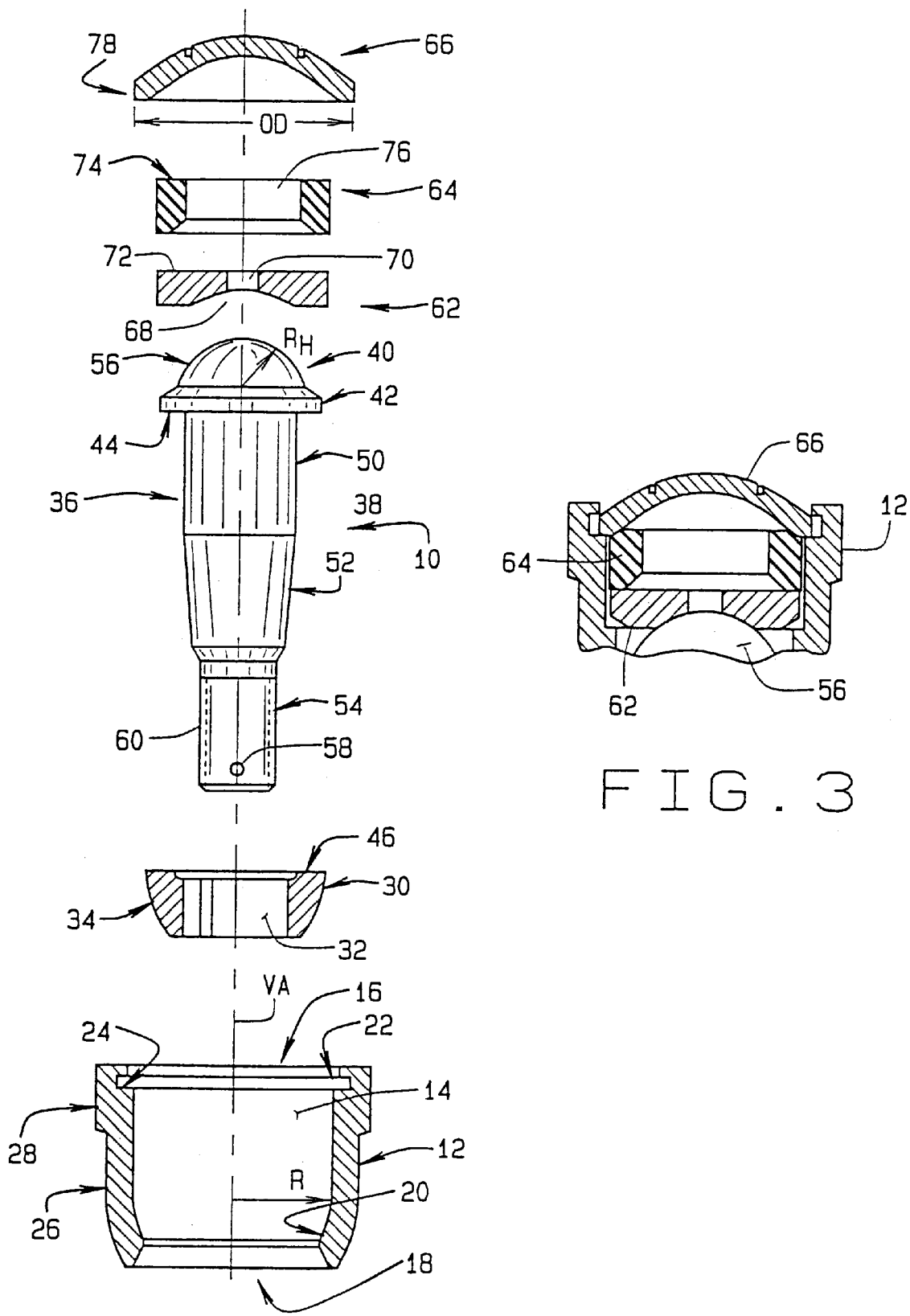

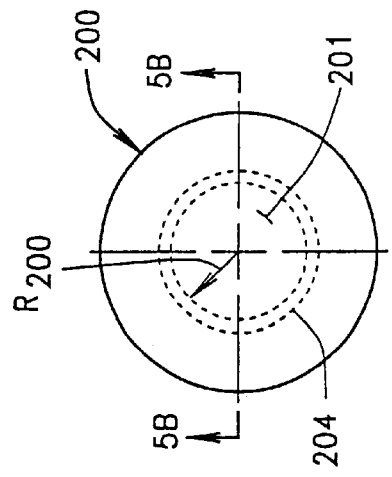
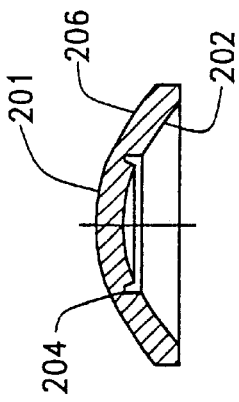
FIG. 5A
FIG. 5B
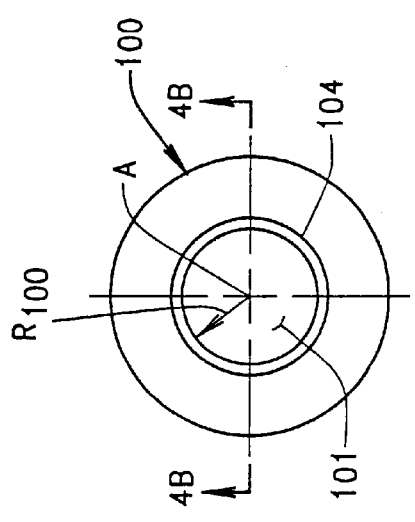
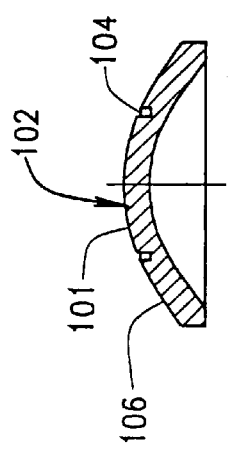
FIG. 4A
FIG. 4B

DEVICE AND METHOD FOR CLOSING MOVABLE SOCKET ASSEMBLIES BY EXPANDING SOLID COVER PLATES

CROSS-REFERENCE TO RELATED APPLICATIONS

None.

STATEMENT REGARDING FEDERALLY SPONSORED RESEARCH

Not Applicable.

BACKGROUND OF THE INVENTION

This invention relates to the manufacturing and assembly of movable sockets, for example, ball-joints as used in automotive steering and suspension systems, and more particularly, to a method and device for performing the operation of closing one end of a movable socket without spinning, swaging, or welding, by means of an expanding solid cover-plate. While the invention is described in detail with respect to automotive applications, those skilled in the art will recognize the broader applicability of the invention.

Conventional ball-joints, and other movable sockets are used, for example, in automotive steering and suspension applications. The sockets comprise a housing having a circular cylindrical internal surface, a ball stud with a ball head contained in the housing, and a synthetic resin, heat treated steel, or sintered alloy bearing member supporting the ball head within the housing. These components are installed into the housing through a posterior opening, with the ball stud extending outward through an axially disposed anterior opening of a smaller diameter than the ball head. Traditionally, the posterior opening is closed by means of a cover-plate, which is spun or swaged in place, as seen in FIGS. 1A–1D. Alternatively, the cover-plate may be welded into place.

Cover-plate elements are traditionally formed from a stamping process, whereby individual components having desired dimensions are stamped from metal sheets. Either during the stamping process or in a subsequent manufacturing step, a raised boss may be drawn or stamped into the cover-plate, and a centrally located hole of predetermined dimensions punched therein to receive a self-tapping or threaded grease fitting.

Once secured in place, the cover-plate presses on the bearing member either directly or indirectly through a resilient rubber intermediate component and a pressure plate.

Bearing components within the housing, against which the ball head or moveable component is articulated, perform best when the housing material is fully hardened, as it is better able to withstand the stresses and frictional wear associated with movement of the bearing components. Accordingly, the use of hardened materials greatly extends the useful life of the bearing components and the housing. However, hardened material surfaces greatly hinder traditional spinning, swaging, or welding operations required to enclose the housing.

Once assembled, movable sockets may be utilized as load carrying members in numerous mechanical systems, including automotive vehicle suspension and steering systems. Obviously, movable sockets or ball-joints employed in these applications are subjected to various operating conditions, and may be required to carry substantial loads. When wear develops, the performance of the movable socket or ball-joint degrades and, in the case of automotive applications, may result in erratic steering or excessive looseness and play in the vehicle suspension system.

As described in U.S. Pat. No. 6,202,280 B1, (herein incorporated by reference) a method and device for expanding a conical or convex cover-plate within the posterior opening may be employed to secure and enclose the socket components within the socket housing, allowing for closure of a fully hardened housing without the need for traditional spinning, swaging, or welding operations.

Alternatively, as is described in U.S. Pat. No. 6,125,541 to Parker, herein incorporated by reference, a two-stage ram having first and second contact surfaces may be utilized to first expand a conical or convex wear-indicator style cover-plate, having an axial opening, within the posterior opening of a housing, and then to further deform the cover-plate to a predetermined final position relative to the internal components of the socket to provide a predetermined wear indicator distance.

Similarly, as is described in co-pending U.S. Patent application Ser. No. 09/681,305, herein incorporated by reference, a two-stage ram having a contact surface and a concentric pivot punch may be brought into engagement with the cover-plate within the posterior opening of a housing for the purpose of closing the housing. Pressure exerted by the two-stage ram is transferred to the cover-plate through the contact surface, expanding the cover-plate to conform to the contact surface and enclosing the internal components within the socket housing. The exerted pressure additionally results in the extension of the concentric pivot punch into the central orifice of the cover-plate, controlling the expansion of the cover-plate and establishing the central orifice to predetermined dimensions upon closure of the socket housing.

Each of the aforementioned devices and methods for closing a movable socket with a ram requires that the cover-plate incorporate an axial opening to permit the desired deformation under load from the ram. However, some socket designs require a sealed or closed cover-plate having no axial opening. Such socket designs still utilize hardened housings, and therefore still have the same housing hardness issues as stated above. In many such applications, the socket is lubricated only prior to the assembly process, and is not lubricated after assembly. These are often referred to as "lubed for life" sockets. The socket closure devices and techniques previously described to overcome the housing hardness issues cannot be utilized with such "lubed for life" sockets, as cover-plates without axial openings will not properly deform under load from the ram, and accordingly, will not result in ideal socket closure.

Accordingly, it is highly advantageous to develop a ram device capable of expanding a solid conical or convex cover-plate within a socket housing to enclose the housing without the need for specialized spinning, swaging, or welding operations.

BRIEF SUMMARY OF THE INVENTION

Briefly stated, a first aspect of the present invention provides an expanding solid cover plate for closing one end of a movable socket. The expanding solid cover plate incorporates either an upper or lower circumferential groove to control and direct deformation of the solid cover-plate during an expansion process resulting in the solid-cover plate engaging and closing one end of a movable socket.

A second aspect of the present invention provides a ram stop-out plate configured to engage an expanding solid cover plate having either an upper or lower circumferential groove, and for directing an applied force to the solid cover plate, whereby the cover plate is deformed and expanded to close one end of a movable socket.

A third aspect of the present invention features an assembly technique for enclosing an open end of a movable socket comprised of fully hardened materials with an expanding solid cover-plate having a circumferential groove on either an upper or lower surface. During assembly, various internal components of the movable socket are installed within a housing through a posterior opening and a solid conical or convex cover-plate having a circumferential groove on either an upper or lower surface is positioned over the components within the posterior opening. A ram of the present invention having a contact surface is brought into engagement with the solid cover-plate. Pressure exerted by the ram is transferred to the cover-plate through the contact surface, deforming and expanding the cover-plate to close the socket housing.

A fourth aspect of the present invention is an assembly technique for enclosing an open end of a movable socket comprised of fully hardened materials with an expanding solid cover-plate so as to force a quantity of lubricant material to flow though the movable socket assembly during the closure process. Forcing the flow of lubricant through the socket assembly eliminates the need to pre-lubricate individual components prior to placement in the socket assembly.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1A is a sectional view of a prior art apparatus for spin and swaging closure of a socket assembly;

FIG. 1B is sectional view of the prior art apparatus of FIG. 1A compressing the components of a socket assembly;

FIG. 1C is a sectional view of the prior art apparatus of FIG. 1A engaging and swaging the housing material of the socket assembly to entrap the cover-plate;

FIG. 1D is a sectional view of the prior art apparatus of FIG. 1A upon completion of the socket closing procedure;

FIG. 2 is an exploded view of one illustrative embodiment of a movable socket assembly employing the expanding cover-plate of the present invention;

FIG. 3 is a partial view illustrating the movable socket of FIG. 2, with the upper end components in-place, prior to expansion of the cover-plate;

FIG. 4A is a top view of one embodiment of an expanding solid cover-plate of the present invention, having an upper circumferential groove;

FIG. 4B is a side sectional view of the expanding solid cover-plate of FIG. 4A, taken along lines 4B—4B;

FIG. 5A is a top view of one embodiment of an expanding solid cover-plate of the present invention, having a lower circumferential groove;

FIG. 5B is a side sectional view of the expanding solid cover-plate of FIG. 5A, taken along lines 5B—5B;

Corresponding reference numerals indicate corresponding parts throughout the several figures of the drawings.

DESCRIPTION OF THE PREFERRED EMBODIMENT

Figure 6A:
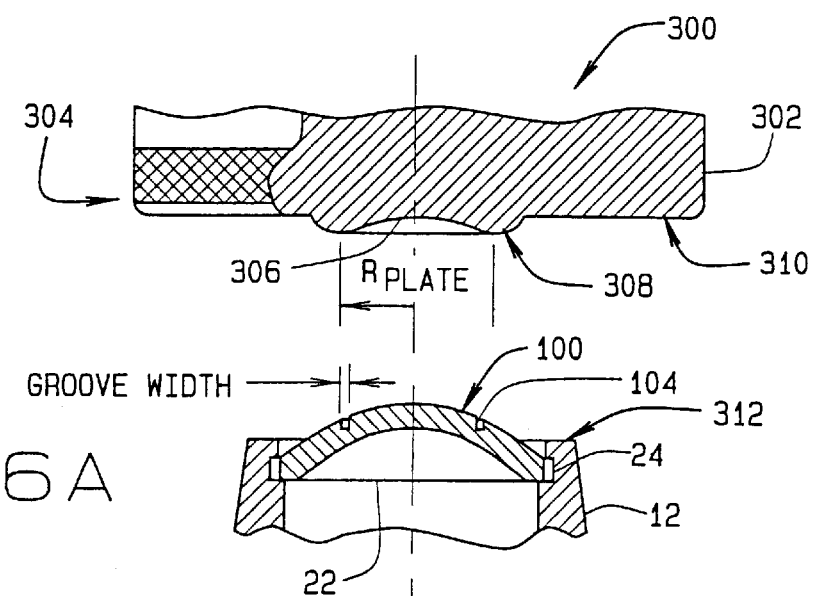
FIG. 6A is a sectional view of a ram stop-out plate of the present invention together with an expanding solid cover-plate having an upper circumferential groove as seen in FIG. 4A positioned in a socket housing, prior to closure.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring generally to FIGS. 2 and 3 the two-stage expanding cover-plate assembly method of the present invention may be used to enclose a movable socket, such as the ball-joint shown at 10, within a housing 12 without the need for spinning, swaging, or welding. Those skilled in the art will readily recognize the applicability of the following method to the assembly of a variety of different movable sockets; to facilitate the description of the method and devices used in conjunction therewith, the preferred embodiment of present invention is described in reference to a ball-joint 10, but is not limited to use therewith.

Housing 12, within which the various internal components of the ball-joint are enclosed, is generally cylindrical, with a central bore 14 of non-uniform radius having a posterior opening 16 and an anterior opening 18. The radius R of central bore 14 decreases to define a curved surface 20 at the base of the housing, adjacent anterior opening 18. A counterbore 22 having a circumferential groove 24 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of ball-joint 10 to other components (not shown). As may be appreciated, the ridge 28 also may be adapted for other specific kinds of installations employing threads or other connectors (not shown).

To assemble ball-joint 10, a bearing 30 sized to fit within central bore 14 is seated within housing 12. The bearing 30 includes a central bore 32 axially aligned with a vertical axis VA of the housing, and a curved outer surface 34 of bearing 30 is designed to correspond to the curvature of surface 20 in housing 12.

Next, a stud 36 having a generally cylindrical body 38 and an enlarged head portion 40 with a circumferential flange 42 is passed through central bores 32 and 14, such that the underside 44 of flange 42 rests on an upper surface 46 of the bearing seated within the housing. The body 38 includes a uniform diameter upper portion 50 adjacent flange 42, a tapered central portion 52, and a lower portion 54 of a narrow uniform diameter. The upper portion 50 is sized to fit within the central bore 32 of bearing 30, with the central portion 52 and lower portion 54 extending through the anterior opening 18, externally of housing 12. The head portion 40 includes a hemispherical surface 56 with a radius RH greater than that of upper portion 50, but less than radius R of the housing 12. When assembled, the hemispherical surface 56 and the curved outer surface 34 define a generally spherical unit within housing 12, allowing for conical movement of stud 36. Those skilled in the art will readily recognize that numerous shapes and configurations for stud 36 and bearing 30 are possible. For example, the stud 36 may include a generally spherical head, eliminating the need for bearing 30, or the cylindrical body may include threads (not shown), bores as at 58, or grooves as at 60, for attachment of external components (not shown).

Once stud 36 and bearing 30 are seated within the housing, a pressure plate 62 and a rubber cushion preload device 64 are placed within central bore 14, above hemispherical surface 56, and secured therein by an expanding solid cover-plate 66. The pressure plate 62 sits on top of stud 36, and includes a curved indentation 68 having a radius of curvature corresponding to RH, and an axial passage 70 formed in it. The rubber cushion preload device 64 sits, in turn, on an upper surface 72 of pressure plate 62, and serves to hold the pressure plate 62 in place against the stud 36 while simultaneously permitting small movements in response to the conical movement of the stud. The rubber cushion preload device comprises a cylindrical body 74, having an axial passage 76 formed in it. Finally, solid cover-plate 66, shown in an un-expanded conical configuration in FIG. 2, is placed above the rubber cushion 64 adjacent counter-bore 22, for vertical compression and lateral expansion as will be described, to seat within circumferential groove 24 and enclose the various components within housing 12. To facilitate the insertion of the solid cover-plate 66 within the posterior opening of housing 12, the solid cover-plate 66 includes a circumferential rim 78 having and outer diameter OD sized to fit within counter-bore 22. FIG. 3 illustrates the arrangement of the ball-joint 10 upper components 36, 62, 64, and 66 prior to the expansion of the solid cover-plate 66.

As indicated above, those skilled in the art will recognize that the various internal components of the moveable socket secured within the housing 12 by the solid cover-plate 66 may be varied in size and shape depending upon the particular application for which the movable socket is designed, and accordingly, the above described ball-joint 10 is merely exemplary of one embodiment.

Turning next to FIGS. 4A and 4B, a first embodiment 100 of the expanding solid cover-plate 66 of the present invention is shown. The cover-plate 100 is symmetric about a central axis A, and in unexpanded form includes a central convex portion 101, surrounded by a conical peripheral portion 106. As seen in FIGS. 4A and 4B, the upper surface 102 of the cover-plate 100 includes a circumferential groove 104 disposed between the central convex portion 101 and the conical peripheral portion 106. The circumferential groove 104 preferably has a depth of approximately 50% of the material thickness of the cover-plate 100. The depth of the groove is selected so that when a sufficient force or load is placed on the cover-plate 100 during the socket closure process, a stress concentration occurs in the vicinity of the circumferential groove. The radial location R100 of the circumferential groove 104 from the central axis A of the cover-plate regulates the final shape and configuration of the cover-plate 100 after closure of a movable socket housing 12, as will be more clearly set forth below.

Turning next to FIGS. 5A and 5B, a second embodiment 200 of the expanding solid-cover plate 66 of the present invention is shown. The cover-plate 200 is symmetric about a central axis A, and in unexpanded form includes a central convex portion 201, surrounded by a conical peripheral portion 206. As seen in FIGS. 5A and 5B, the lower surface 202 of the cover-plate 200 includes a circumferential groove 204 disposed between the central convex portion 201 and the conical peripheral portion 206. The circumferential groove 204 preferably has a depth of approximately 50% of the material thickness of the cover-plate 200. The depth of the groove is selected so that when a sufficient force or load is placed on the cover-plate 200 during the socket closure process, a stress concentration occurs in the vicinity of the circumferential groove. The radial location R200 of the circumferential groove 204 from the central axis A regulates the final shape and configuration of the cover-plate 200 after closure of a movable socket housing 12, as will be more clearly set forth below.

Turning next to FIGS. 6A–6E, the utilization of a solid cover-plate 100 to close a movable socket housing 12 is shown in stages. In FIG. 6A, a solid cover-plate 100 is shown in an un-expanded convex configuration, placed adjacent counter-bore 22 in the housing 12, for vertical deformation and lateral expansion to seat within circumferential groove 24 and enclose the various components within the housing 12. A ram 300 is positioned above the solid cover-plate 100 and configured to exert a load onto the cover-plate 100, thereby deforming and expanding it to close the housing 12.

The basic design and operation of the ram 300 is described in detail in U.S. Pat. No. 6,202,280 B1, with improvements and adaptations for use with solid cover-plates set forth herein. The lower surface of the ram 300 is fitted with a removable stop-out plate 302 having a working face 304, adapted to engage the solid cover-plate 100. In the embodiment shown in FIGS. 6A–6E, the removable stop-out plate 302 comprises an axially located concave primary contact surface 306 having a spherical radius equal to the spherical radius of the central dome area 101 or 201 on the solid cover-plate 100 or 200 for which the stop-out plate 302 is adapted. The outer perimeter of the concave primary contact surface 306 has a radial displacement $R_{PLATE}$ corresponding to the radial placement R100 of the circumferential groove 104 in the solid cover-plate 100. The primary contact surface 306 is surrounded by a raised toroid defining a secondary contact surface 308. Radially outward from the toroid surface 308 is a flat final contact stop-out surface 310 adapted to contact the upper surface 312 of the housing 12 upon closure thereof. The final contact surface establishes the depth to which the cover-plate 100 or 200 is finally deformed.

Figure 6B:
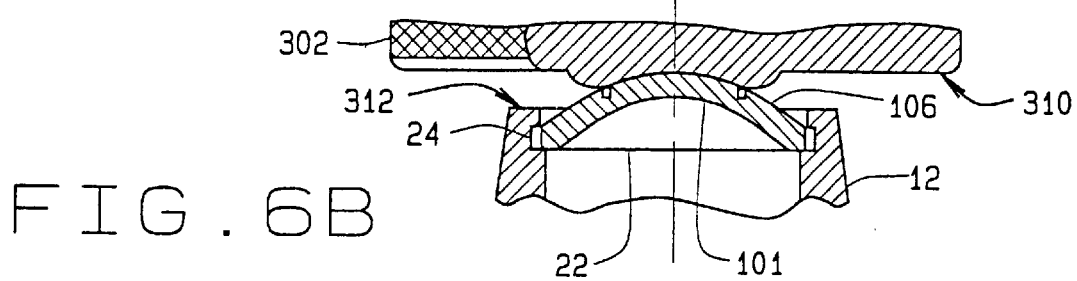
FIG. 6B is a sectional view of the ram stop-out plate of FIG. 6A applying a load to the expanding solid cover-plate, resulting in downward deformation thereof within the housing.

As seen in FIG. 6B, the primary contact surface 306 of the stop-out plate 302 is brought into engagement with the convex upper surface 102 of the solid cover-plate 100. The ram 300 is then utilized to exert an axially downward force on the solid cover-plate 100 through the stop-out plate 302. Initially, stress and force concentrations in the region of the circumferential groove 104 in the solid cover-plate 100 cause an extrusion of the cover-plate material opposite the circumferential groove 104. This extrusion of the cover-plate material results in the deformation of the cover-plate 100 into a flattened configuration, seen in FIG. 6C, as the inner convex portion 101 of the cover-plate 100 is pressed downward, closing the circumferential groove 104. Simultaneously, the outer conical perimeter 106 of the solid cover-plate 100 is contacted by the toroid surface 308 of the stop-out plate 302, and is forced into engagement with the circumferential groove 24 formed in the bore 14 of the socket housing 12.

Figure 6C:
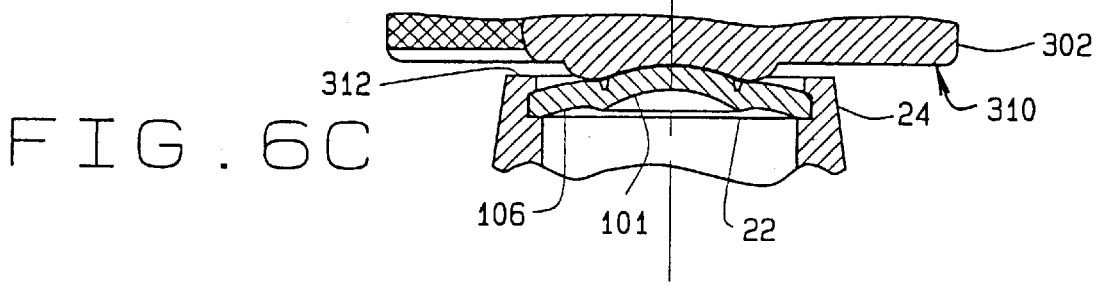
FIG. 6C is a sectional view similar to FIG. 6B, wherein continued application of a load on the expanding solid cover-plate by the ram stop-out plate results in cover-plate expansion.
Figure 6D:
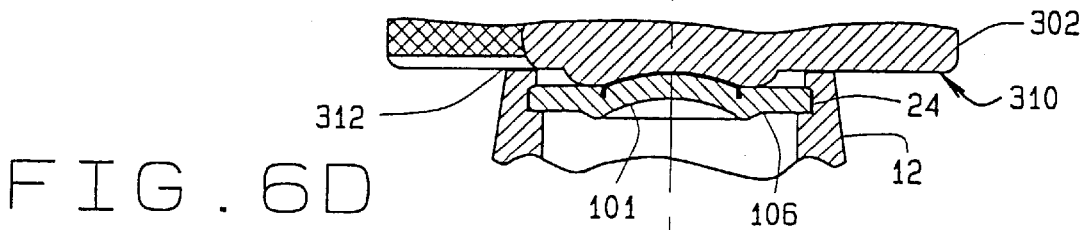
FIG. 6D is a sectional view similar to FIG. 6C, wherein the ram stop-out plate has reached a maximum travel limit, contacting the housing surface.

As seen in FIGS. 6C and 6D, continued exertion of axially downward force on the solid cover-plate 100 by the toroid surface 308 of the stop-out plate 302 causes a lateral expansion of the outer conical peripheral 106 of the solid cover-plate 100 into a generally flat configuration by redirecting downward forces exerted by the ram 300 into radially outward forces, resulting in a expansion engagement between the cover-plate 100 and the circumferential groove 24 in the socket housing. Additionally, the inner convex portion 101 of the cover-plate 100 acts to restrict any inward radial movement of the outer conical peripheral portion 106, as it is restrained from deformation by the primary contact surface 306, further resulting in greater outward expansion of the cover-plate 100. Downward force is exerted by the ram 300 until the final contact stop-out surface 310 contacts the upper surface 312 of the housing 12, preventing further downward movement thereof.

Figure 6E:
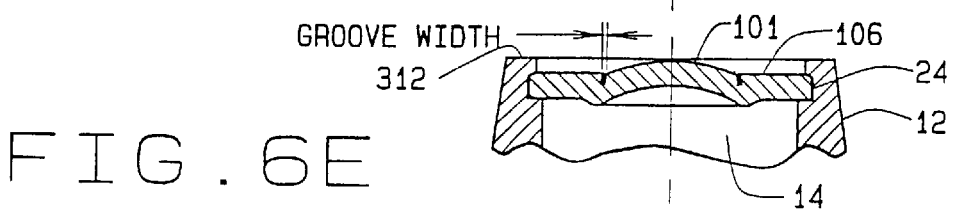
FIG. 6E is a sectional view similar to FIG. 6D, wherein the ram stop-out plate has been withdrawn, and the housing sealed by the expansion of the solid cover plate with an upper circumferential groove.

As seen in FIG. 6E, following contact between the upper surface 312 of the housing 12 and the stop-out plate 302 of the ram 300, the ram 300 is withdrawn, and the socket closure procedure is complete. The solid cover-plate 100 is fully engaged with the circumferential groove 24, closing the housing. The convex central portion 101 of the cover-plate remains in the form of a raised central dome or boss, providing clearance for the internal components of the socket housing. The circumferential groove 104 is completely closed by the deformation of the cover-plate during the closure process, and a portion of the cover-plate 100 opposite the circumferential groove 104 extends downward into the bore 14 of the socket housing below the level of the flattened outer conical peripheral 106.

Figure 7A:
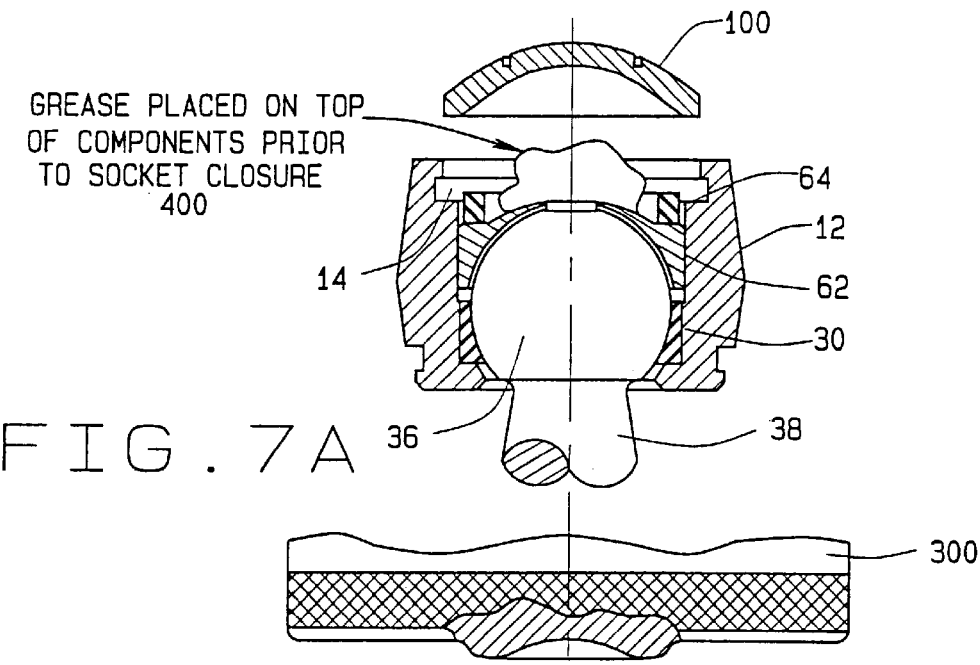
FIGS. 7A through 7C illustrate the flow of a lubricant material through a socket housing assembly during the closure process illustrated in FIGS. 6A–6E.
Figure 7B:
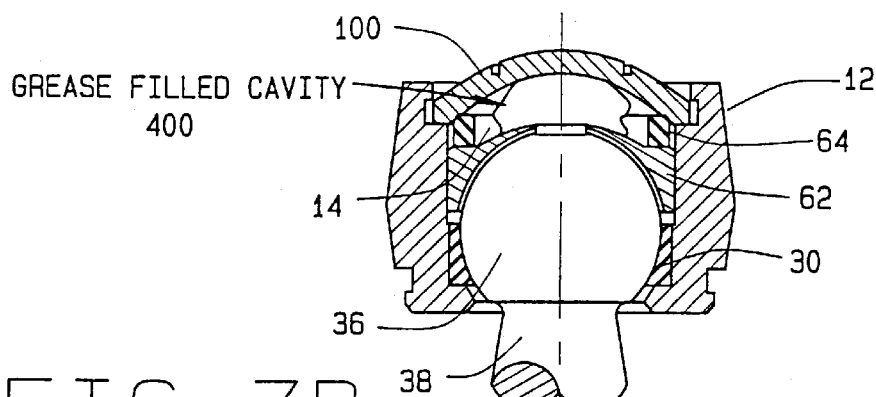
Figure 7C:
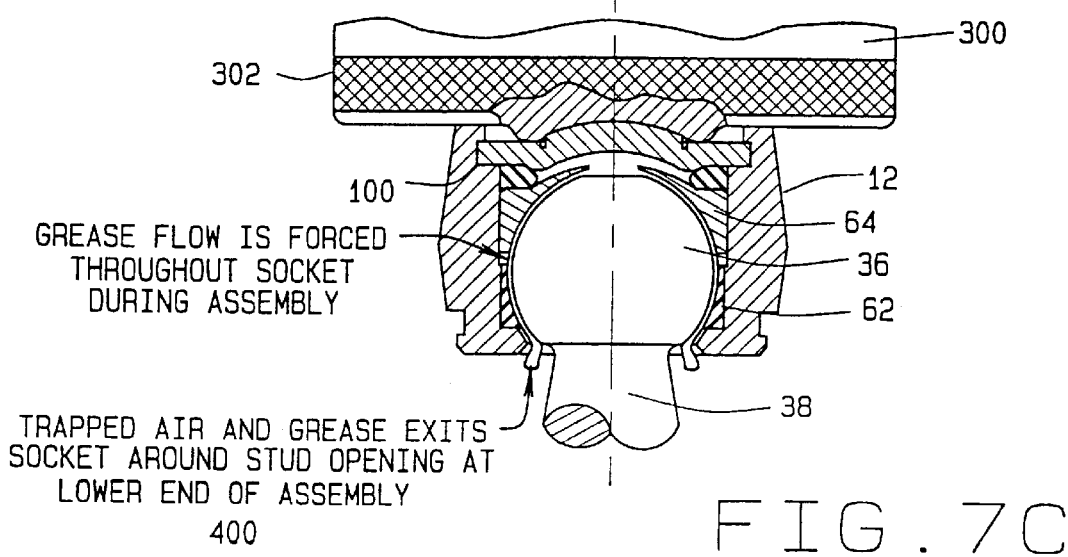

Turning next to FIGS. 7A–7C, an additional feature of the above-described closure method for a movable socket utilizing an expanding solid cover-plate is shown. Specifically, a quantity of lubricant material 400, such as grease or the like, is placed into the socket housing 12 prior to the placement of the solid cover-plate 100 into the socket bore 14. (FIG. 7A). The solid cover-plate 100 is then positioned within the socket bore 14 for the commencement of the deformation and expansion closure procedure described above. (FIG. 7B). The socket housing 12 is then closed by the deformation and expansion of the solid cover-plate 100 under the forces exerted by the ram 300. As is seen in FIG. 7C, the lubricant material 400 is forced, under pressures exerted by the closure of the socket 12, to flow into voids and gaps between the components placed within the socket housing 12. Trapped air and any excess quantities of lubricant material 400 exit the socket housing anterior opening 18, around the cylindrical body 38 of the stud 36. In this manner, the lubricant material 400 is evenly distributed throughout the voids and gapes between the components in the housing 12, generally providing sufficient lubrication for the useful operational life of the socket.

Turning next to FIGS. 8A–8E, the utilization of a solid cover-plate 200, having a circumferential groove 204 on the lower surface, to close a movable socket housing 12 is shown in stages. As was previously shown with the solid cover-plate 100 in FIGS. 6A–6E, in FIG. 8A an unexpanded solid cover-plate 200 is placed adjacent counter-bore 22 in the housing 12, for vertical deformation and lateral expansion to seat within circumferential groove 24 and enclose the various components within the housing 12. The ram 300 is positioned above the solid cover-plate 200 and configured to exert a load onto the cover-plate 200, thereby deforming and expanding it to close the housing 12.

As previously described, the lower surface of the ram 300 is fitted with a removable stop-out plate 302 having a working face 304, adapted to engage the solid cover-plate. In the embodiment shown in FIGS. 8A–8E, the removable stop-out plate 302 comprises an axially located concave primary contact surface 306 having a spherical radius equal to the spherical radius of the central dome area 201 on the solid cover-plate 200 for which the stop-out plate 302 is adapted. The outer perimeter of the concave primary contact surface 306 has a radial displacement $R_{PLATE}$ corresponding to the radial placement R200 of the circumferential groove 204 in the solid cover-plate 200. The primary contact surface 306 is surrounded by a raised toroid defining a secondary contact surface 308. Radially outward from the toroid surface 308 is a flat final contact stop-out surface 310 adapted to contact the upper surface 312 of the housing 12 upon closure thereof. The final contact surface establishes the depth to which the cover-plate 200 is finally deformed.

Figure 8A:
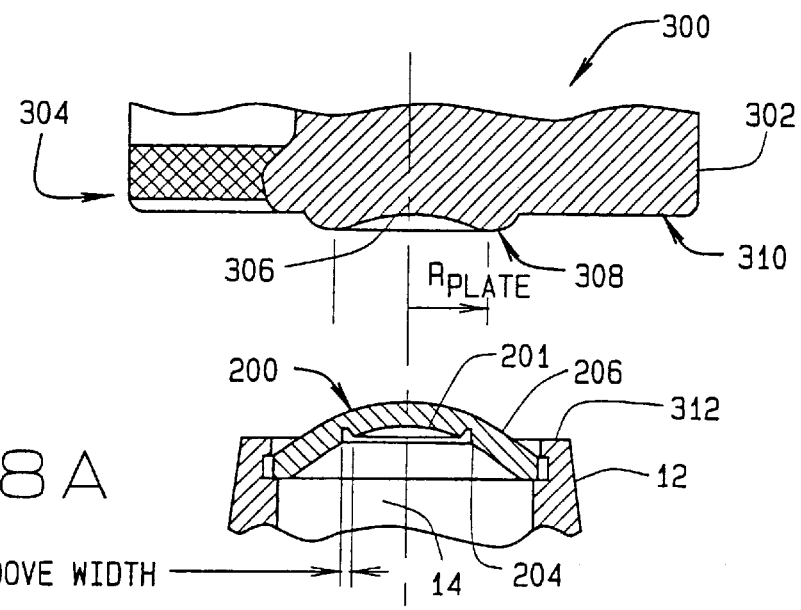
FIG. 8A is a sectional view of a ram stop-out plate of the present invention together with an expanding solid cover-plate having a lower circumferential groove as seen in FIG. 5A positioned in a socket housing, prior to closure.
Figure 8B:
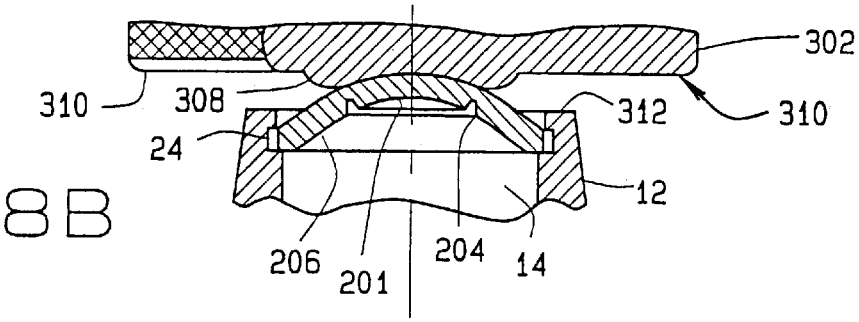
FIG. 8B is a sectional view of the ram stop-out plate of FIG. 8A applying a load to the expanding solid cover-plate, resulting in downward deformation thereof within the housing.

As seen in FIG. 8B, the primary contact surface 306 of the stop-out plate 302 is brought into engagement with the convex upper surface 202 of the solid cover-plate 200. The ram 300 is then utilized to exert an axially downward force on the solid cover-plate 200 through the stop-out plate 302. Initially, stress and force concentrations in the region of the circumferential groove 204 in the solid cover-plate 100 cause an expansion of the circumferential groove 204. This expansion of the cover-plate material results in the deformation of the cover-plate 200 into a flattened configuration, seen in FIG. 8C, as the inner convex portion 201 of the cover-plate 200 is pressed downward. Simultaneously, the outer conical perimeter 206 of the solid cover-plate 200 is contacted by the toroid surface 308 of the stop-out plate 302, and is forced into engagement with the circumferential groove 24 formed in the bore 14 of the socket housing 12.

Figure 8C:
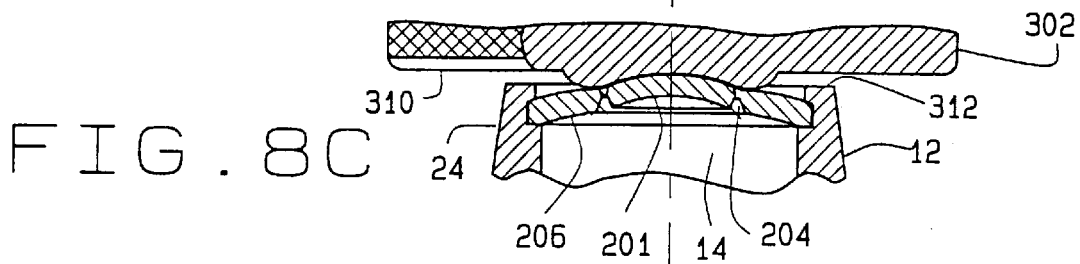
FIG. 8C is a sectional view similar to FIG. 8B, wherein continued application of a load on the expanding solid cover-plate by the ram stop-out plate results in cover-plate expansion.
Figure 8D:
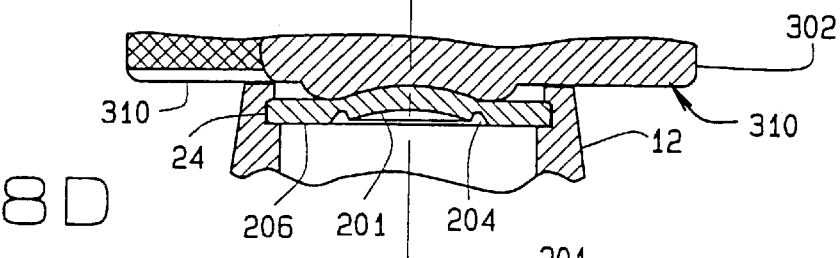
FIG. 8D is a sectional view similar to FIG. 8C, wherein the ram stop-out plate has reached a maximum travel limit, contacting the housing surface.

As seen in FIGS. 8C and 8D, continued exertion of axially downward force on the solid cover-plate 200 by the toroid surface 308 of the stop-out plate 302 causes a radial expansion of the outer conical peripheral 206 of the solid cover-plate 200 into a generally flat configuration by redirecting downward forces exerted by the ram 300 into radially outward forces, resulting in a expansion engagement between the cover-plate 200 and the circumferential groove 24 in the socket housing. Additionally, the inner convex portion 201 of the cover-plate 200 acts to restrict any inward radial movement of the outer conical peripheral portion 206, as it is restrained from deformation by the primary contact surface 306, further resulting in greater outward expansion of the cover-plate 200. Downward force is exerted by the ram 300 until the final contact stop-out surface 310 contacts the upper surface 312 of the housing 12, preventing further downward movement thereof.

Figure 8E:
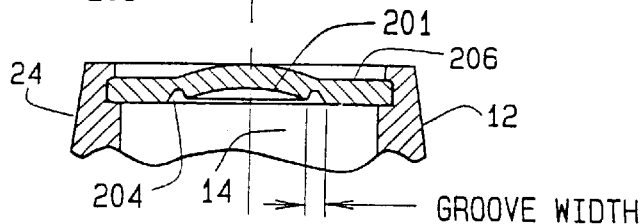
FIG. 8E is a sectional view similar to FIG. 8D, wherein the ram stop-out plate has been withdrawn, and the housing sealed by the expansion of the solid cover plate with an lower circumferential groove.

As seen in FIG. 8E, following contact between the upper surface 312 of the housing 12 and the stop-out plate 302 of the ram 300, the ram 300 is withdrawn, and the socket closure procedure is complete. The solid cover-plate 200 is fully engaged with the circumferential groove 24, closing the housing. The convex central portion 201 of the cover-plate remains in the form of a raised central dome or boss, providing clearance for the internal components of the socket housing. The circumferential groove 204 is further expanded by the deformation of the cover-plate during the closure process, and a portion of the cover-plate 200 adjacent the inner edge of the circumferential groove 204 remains above the level of the flattened outer conical peripheral 206 within the socket bore 14.

Those of ordinary skill in the art will readily recognize that the embodiments of the present invention shown herein may be varied depending upon the particular application for which the movable socket it to be utilized. Specifically, the placement of the circumferential groove on the solid cover-plate, on either the upper or lower surface, as well as the radial location thereof, affects the final configuration of the expanded and deformed cover-plate after closure of a socket. The radial location of the circumferential groove defines the size of the central dome or boss of the deformed and expanded cover plate. Similarly, placement of the circumferential groove on either the upper or lower surface of the cover-plate defines the amount of cover-plate material which will extrude below the flattened cover-plate after closure of a socket.

Correspondingly, the design of the working face of the stop-out plate on the ram utilized to close the socket with a solid cover-plate of the present invention is dependent upon the configuration of the solid cover-plate being utilized. Specifically, the primary contact surface of the stop-out plate must be matched to the convex shape of the unexpanded solid cover-plate, and the secondary contact surface must be positioned and sized to properly deform and expand the outer peripheral portions.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An expandable solid cover-plate for closing one end of a movable socket housing; comprising:
   an axially symmetric convex central portion, said convex central portion having a uniform thickness;
   a conical peripheral portion surrounding said convex central portion, said conical peripheral portion having said uniform thickness; and
   a circumferential groove disposed between said convex central portion and said conical peripheral portion, said circumferential groove defined by an annular region of reduced thickness wherein said conical peripheral portion is configured to radically expand responsive to an axial load.

2. The expandable solid cover-plate of claim 1 wherein said circumferential groove is disposed in an upper surface of said expandable solid cover-plate.

3. The expandable solid cover-plate of claim 1 wherein said circumferential groove is disposed in a lower surface of said expandable solid cover-plate.

4. The expandable solid cover-plate of claim 1 wherein said circumferential groove is adapted to control deformation of said solid cover-plate during an expansion process.

5. The expandable solid cover-plate of claim 1 wherein said circumferential groove is disposed at a predetermined radial displacement from a central axis of said solid cover-plate.

6. The expandable solid cover-plate of claim 1 wherein said convex central portion and said conical peripheral portion having said uniform thickness each have a first section modulus, and said annular region of reduced thickness has a second section modulus, said second section modulus less than said first section modulus.

7. A method for deforming and expanding a solid cover-plate having an axially symmetric convex central portion, a conical peripheral portion surrounding said convex central portion, and a circumferential groove disposed on an upper surface between said convex and conical portions to close one end of a movable socket housing bore, comprising the steps of:
   positioning said solid cover-plate on a counterbore edge within said movable socket housing bore;
   exerting an axial load on said convex central portion;
   simultaneously extruding a portion of said cover-plate below said circumferential groove and collapsing said circumferential groove;
   subsequent to collapse of said circumferential groove,
      (i) exerting an axial and radial load on said conical peripheral portion;
      (ii) flattening said conical peripheral portion within said movable socket housing bore; and
      (iii) expanding said conical peripheral portion within said movable socket housing bore;
   wherein said convex central portion resists radially inward loads from said expansion of said conical peripheral portion.

8. A method for deforming and expanding a solid cover-plate having an axially symmetric convex central portion, a conical peripheral portion surrounding said convex central portion, and a circumferential groove disposed on a lower surface between said convex and conical portions to close one end of a movable socket housing bore, comprising the steps of:
   positioning said solid cover-plate on a counterbore edge within said movable socket housing bore;
   exerting an axial load on said convex central portion;
   expanding said circumferential groove;
   exerting an axial and radial load on said conical peripheral portion;
   flattening said conical peripheral portion within said movable socket housing bore;
   expanding said conical peripheral portion within said movable socket housing bore; and
   wherein said convex central portion resists radially inward loads from said expansion of said conical peripheral portion.

9. An expandable solid cover-plate for closing one end of a movable socket housing, comprising:

an axially symmetric convex central portion;

a conical peripheral portion surrounding said convex central portion, said conical peripheral portion having a configuration equal to a configuration of said convex central portion;

a circumferential groove disposed in a surface between said convex central portion and said conical peripheral portion;

wherein said conical peripheral portion is configured to radially expand responsive to an axial load.

* * * * *